UNITED STATES PATENT OFFICE.

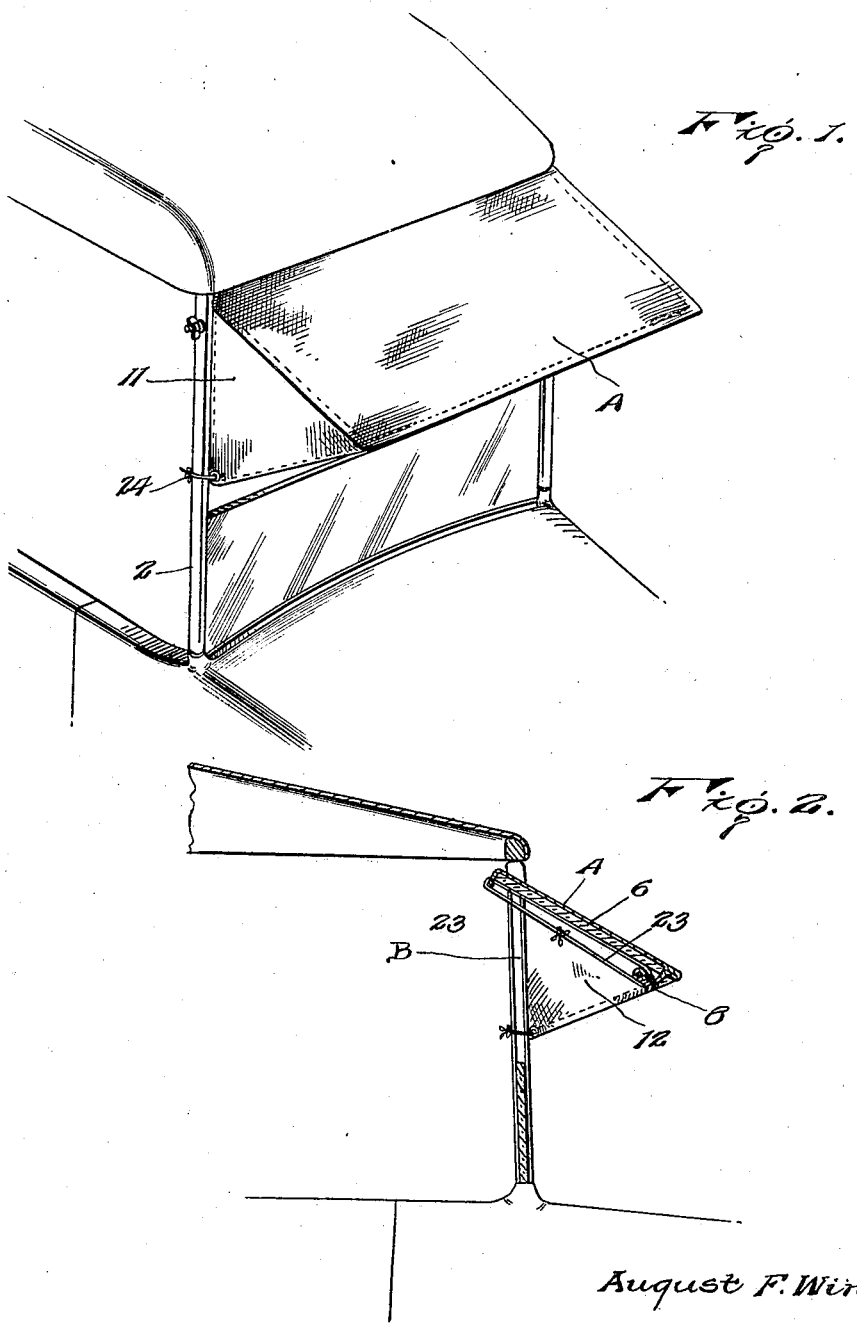

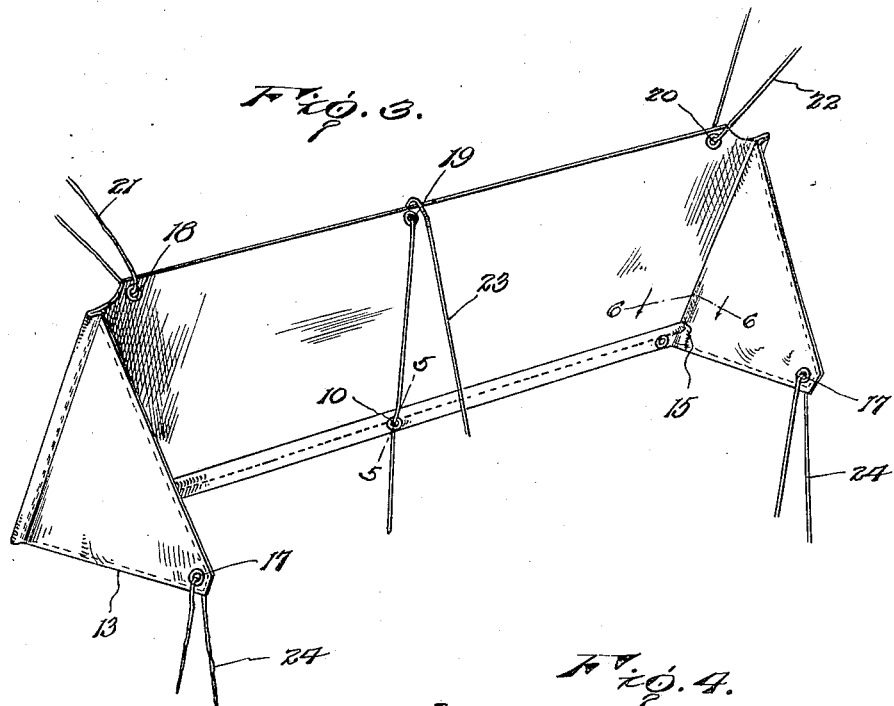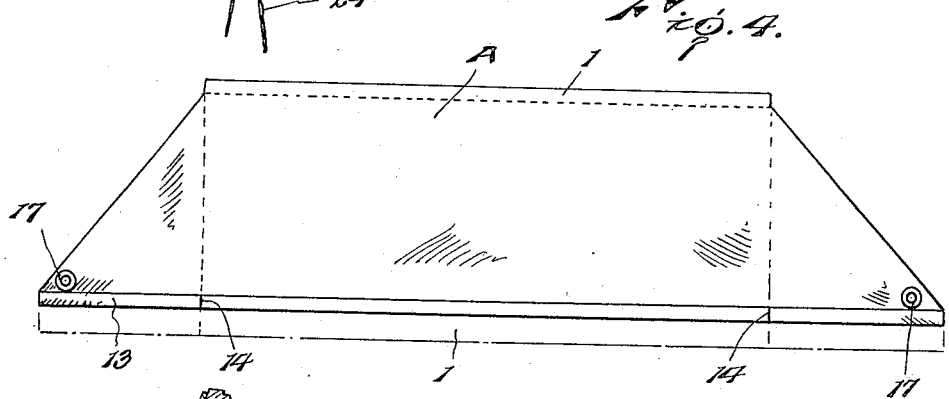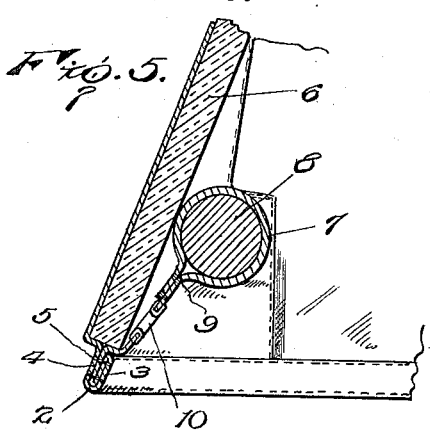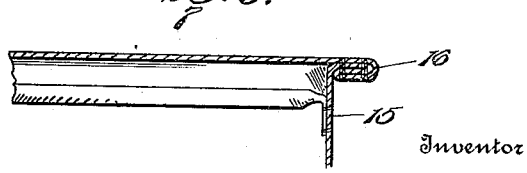

AUGUST F. WINBERG, OF BOUNDBROOK, NEW JERSEY.

WINDSHIELD-VISOR.

1,394,595.

Specification of Letters Patent.　Patented Oct. 25, 1921.

Application filed August 23, 1920. Serial No. 405,422.

*To all whom it may concern:*

Be it known that I, AUGUST F. WINBERG, citizen of the United States, residing at Boundbrook, in the county of Somerset and State of New Jersey, have invented certain new and useful Improvements in Windshield-Visors, of which the following is a specification.

This invention relates to a shield for use in connection with the wind shields of automobiles, the object being to provide a shield of such a character that it protects the driver of the vehicle from the annoying effects of the sun, glare from oncoming headlights, and the beating in of rain.

The present invention provides a shield of the above mentioned character which is so constructed that it may be easily applied or removed and yet, it is not unsightly in appearance.

Other features of the invention consist in the manner of forming the shield so as to neatly fit universal types of wind shields without wrinkling or getting out of place when once put in position.

In the drawings:

Figure 1 is a perspective view of the invention as attached to the wind shield of a vehicle, Fig. 2 is a vertical section transversely of the wind shield, Fig. 3 is a perspective view of the shield detached from the wind shield, Fig. 4 is a plan view showing the blank from which the shield is formed, Fig. 5 is an enlarged vertical section showing the pocket for the edge of the wind shield, such section being taken on the line 5—5 of Fig. 3, Fig. 6 is a sectional view on the line 6—6 of Fig. 3.

In detail:

The shield is formed from a blank A of the shape shown having the portion which is to cover the wind shield surface of substantially rectangular form as indicated in dotted lines in Fig. 4, while the ends, with respect to said dotted lines, are of triangular form with two sides of each triangular portion perpendicular to each other.

The forward edge 1 of the blank between the dotted lines in Fig. 4, is doubled back on the underneath side as indicated at 2 and is then doubled back on itself again as indicated at 3 and then again as indicated at 4, so that a triple fold is formed and then stitched as indicated at 5, to provide an unusually heavy seam which forms the forward side of a pocket receiving the forward edge of the glass portion 6 of the wind shield upper half indicated at B. The fabric is then brought around in a loop as shown at 7 to form an inclosure for a pliable filler member 8 and is stitched as at 9, an eyelet 10 being placed between the triple seam and the loop 7 for a purpose to be hereinafter described. The sides of the blank A are brought downwardly at right angles to the major portion of the blank in order to form side shields 11 and 12 and are doubled back and stitched along their forward edges as indicated at 13, to provide a finished edge which will not ravel. At the angle 14 on each side of the respective side shields, a cut is made to permit fastening of the loop 7 to the sides by stitching 15. The sides themselves, at the bend are triple folded and stitched as indicated at 16 in the same manner as is the forward edge of the blank A. The sides each have an eyelet 17 as indicated, at the end of each side. Three eyelets 18, 19 and 20, one at each end and one in the middle, are located on the upper edge of the blank A.

In applying the shield or visor to a wind shield, the pocket formed by the seam 2 is slipped over the forward edge of the upper half 6 of the wind shield and the eyelets 18, 19 and 20 are brought over the upper edge of the wind shield half and tie strings 21 and 22 are tied around the wind shield stanchions at the top while a tie string 23 is passed through the eyelets 10 and 19 and tied on the under side of the wind shield half 6. Tie strings 24 passing through eyelets 17 are also secured around the wind shield stanchions for the purpose of maintaining the sides 11 and 12 in their proper position.

It will be seen that after the visor is secured to the wind shield there is no fastening which prevents the wind shield from being adjusted in the usual manner.

The visor is preferably made of some such material as heavy duck having a green side toward the driver when the visor is in place so as to present a soft color to the vision.

If desirable, the tie strings and eyelets may be replaced by any other suitable form of fastening means, such as lift-the-dot fasteners, gromets, or buttons.

Having thus described the invention, what is claimed as new is:

1. A visor for mounting on the swinging portion of a vehicle wind shield comprising a length of material having a triple seam at one edge forming a pocket, a loop on the free edge of the pocket containing a filler piece, and sides having a triple seam at the juncture of the sides with the major portion of the visor.

2. A visor for mounting on the swinging portion of a vehicle wind shield comprising a length of material having a triple seam at one edge forming a pocket, a loop on the free edge of the pocket containing a flexible filler piece, and sides having a triple seam at the juncture of the sides with the major portion of the visor.

In testimony whereof I affix my signature.

AUGUST F. WINBERG. [L. S.]